United States Patent [19]

Jackson

[11] Patent Number: 4,807,473
[45] Date of Patent: Feb. 28, 1989

[54] THERMOPLASTIC SIGHT MONITOR

[75] Inventor: William A. Jackson, Houston, Tex.

[73] Assignee: Jogler, Inc., Houston, Tex.

[21] Appl. No.: 135,705

[22] Filed: Dec. 21, 1987

[51] Int. Cl.⁴ .................... G01F 23/02; F16L 47/00
[52] U.S. Cl. ...................................... 73/323; 73/306; 73/326; 285/93
[58] Field of Search ................ 73/323, 325, 326, 306, 73/307; 285/93

[56] References Cited

U.S. PATENT DOCUMENTS

| | | | |
|---|---|---|---|
| 2,732,715 | 1/1956 | Hawkins | 73/323 |
| 2,833,148 | 5/1958 | Hoyt et al. | 73/323 |
| 3,046,785 | 7/1962 | Au Werter | 73/325 |
| 3,096,748 | 7/1963 | Harry | 73/323 X |
| 3,183,716 | 5/1965 | Lyon | 73/323 |
| 3,381,976 | 5/1968 | Goodson et al. | 285/93 |
| 3,693,441 | 9/1972 | von Obstfelder | 73/323 X |
| 4,335,825 | 6/1982 | Sakazume | 73/323 X |
| 4,371,490 | 3/1983 | Mizusaki | 220/82 A X |
| 4,753,458 | 6/1988 | Case et al. | 285/93 |

FOREIGN PATENT DOCUMENTS 0828013 1/1952 Fed. Rep. of Germany ........ 73/325

Primary Examiner—Daniel M. Yasich
Attorney, Agent, or Firm—Vaden, Eickenroht, Thompson & Boulware

[57] ABSTRACT

A liquid sight monitor includes a translucent thermoplastic viewing tubular element having ends that are flared, after the tube is inserted through the central holes of flanges located at either end, to secure the viewing element in place. A float may be included in the viewing element of the same material and cup shaped to entrap air so that the float rises to the level of the fluid surface, even though it is otherwise heavier than the fluid. A flow-through restrictor disk prevents the float from falling out the bottom of the viewing element when there is an absence of fluid therein. The monitor may have a protective see-through shield connected between its top and bottom flanges, if desired.

8 Claims, 1 Drawing Sheet

THERMOPLASTIC SIGHT MONITOR

BACKGROUND OF THE INVENTION

1. Field of the Invention

This invention pertains to a liquid sight monitor for monitoring the presence of liquid in an accompanying liquid system and/or the level of liquid in such a liquid system, which liquid may be of a type that is highly corrosive to the materials previously employed in liquid sight monitors.

2. Description of the Prior Art

Liquid sight monitors include both sight flow indicators and liquid level gauges. As a sight flow indicator, a liquid sight monitor is employed as a bypass section or as an in-line section of a passive or flowing liquid system to show an observer whether liquid is present in the system. As a liquid level gauge, a sight monitor is employed in a vertical bypass connection to show an observer the standing liquid level of the system to which it is connected.

Typically, a transparent glass tube is used in the sight monitor to provide viewing of the liquid systems. Such tube can be shielded by a metallic or plastic sleeve with an elongate slit to permit viewing of the glass tube. Also, a concentric tube can be provided around the tube for providing an annular space between the tubes that helps keep the viewing tube clear. As desired, such space can be, environmentally left alone, or the space may be evacuated or filled with a gas, and may be separately cooled or heated differently from the monitored system. Examples of sight monitors are shown in U.S. Pat. No. 3,381,976, Goodson et al, issued May 7, 1968; U.S. Pat. No. 4,345,468, Jackson, issued Aug. 24, 1982 and U.S. Pat. application Ser. No. 785,782, Jobe, filed Oct. 8, 1985, and now abandoned all of which are commonly assigned and incorporated herein by reference for all purposes.

The connectors of liquid sight monitors previously employed with the glass tubes just described have included metallic or plastic flanges accepting inserts for connecting the glass tube or tubes to the flanges and to the liquid system tank, pipe or the like. The connecting inserts have heretofore been made of fluoroplastics or other firm body material for accepting O-rings of neoprene or similar resilient material or have included integral ridges dimensioned to provide the required resiliency for sealing against the glass tube or tubes. The tubes themselves have desirably been made of borosilicate glass or other similar materials.

Although certainly suitable for many if not most applications, such prior art sight monitors do include some form of glass for the viewing element. Glass is inert to many liquids, but not all. For example, hydrofluoric acid will etch and eventually dissolve glass. A glass viewing element also requires a connecting insert with or without O-rings, as briefly described above, to allow it to be connected in place with a metallic or plastic flange end. These elements also are subject ot corrosive attack by some fluids. In addition, they age over a period of time and are subject to becoming fouled by grime and other constituent components existing in some liquid systems. This means that the system frequently has to be shut down and the sight monitor disassembled and cleared. Parts thereof are in need of fairly frequent replacement, as well.

Therefore, it is a feature of the present invention to provide an improved viewing element for a liquid sight monitor that resists corrosive attack by liquids that attack glass and not requiring other connecting component parts for joining the viewing element to a connecting flange, thereby avoiding other potentially corrosive attacks.

It is another feature of the present invention to provide an improved liquid sight monitor in a translucent thermoplastic embodiment having a self-mounting configuration.

SUMMARY OF THE INVENTION

The liquid sight monitor herein disclosed includes as a viewing element a translucent thermoplastic tube that permits monitored fluid from an accompanying liquid system to be seen therethrough. An annular flange having a central opening therein is employed to bolt an end of the liquid sight monitor over an opening of the vessel in which the liquid system is located, normally a storage tank or the like. The tube passes through the central opening of the flange and is heated to a temperature to such a degree that the tube becomes plastic. The tube is then flared with an appropriate tool so that the flared end of the tube surrounds the central openings of the flange and lies flat thereagainst, thereby retaining the tube in the flange and forming a raise-face gasket for the flange.

A preferred embodiment of the liquid sight monitor utilizes a fluoroplastic material for the viewing element.

If desired a float made in an inverted cup configuration of similar fluoroplastic material can be located within the tube to enhance the appearance of the surface of the fluid within the tube. A disc-shape restrictor with flow-through openings can be included at the lower end of the tube to retain the float within the tube when fluid empties therefrom.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope, for the invention may admit to other equally effective embodiments.

IN THE DRAWINGS

Figure 1:
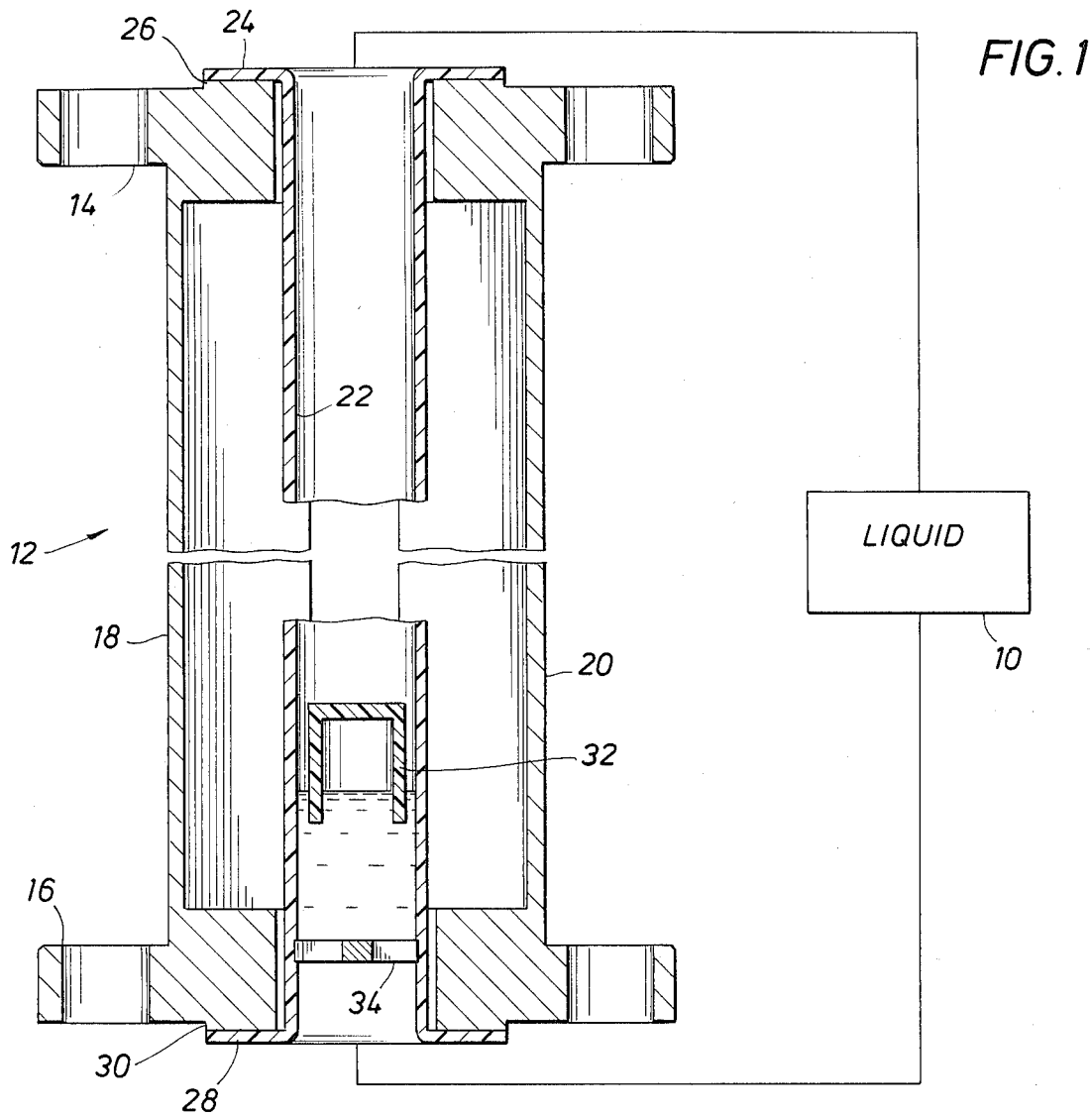

FIG. 1 is a partial vertical cross sectional view of a liquid sight monitor in accordance with a first preferred embodiment of the present invention.

Figure 2:
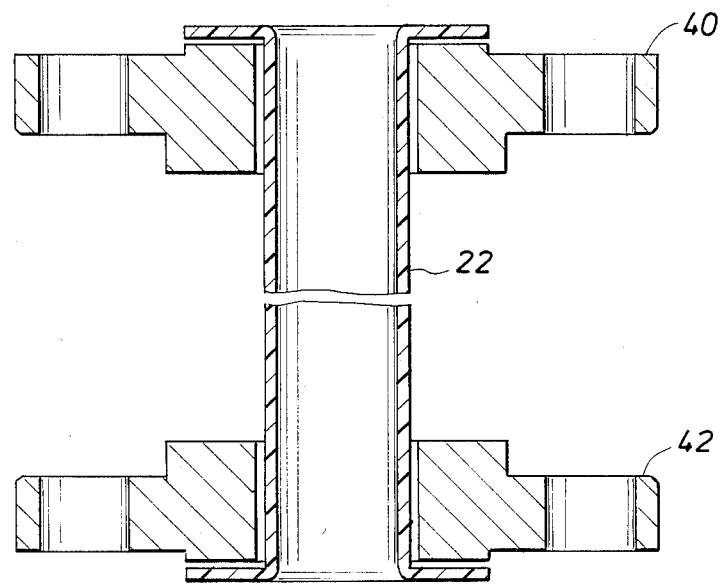

FIG. 2 is a partial vertical cross sectional view of a liquid sight monitor in accordance with a second preferred embodiment of the present invention.

DESCRIPTION OF THE PREFERRED EMBODIMENTS

Now referring to the drawings and first to FIG. 1, a liquid system 10 shown in schematic form is connected to a liquid site monitor in accordance with the present invention, the monitor 12 being vertically aligned. Generally, an upper flange 14 and a lower flange 16 are provided with appropriate bolt holes for bolting the liquid site monitor to the accompanying liquid system in a manner well known and need not be further described herein.

Shield sections 18 and 20 are welded to flanges 14 and 16 so as to provide a central vertical slit therebetween so that the observer may observe the viewing tube centrally mounted in the manner hereafter explained.

Viewing tube 22 made of a thermoplastic material is translucent so as to permit the visualization of the fluid level rising in the tube. The top end of tube 22 prior to being flared is inserted through the central opening of flange 14 to a sufficient amount so that when it is flared in the manner shown in FIG. 1, it will annularly surround the central opening of the flange. It will also extend so that it covers the raised central portion of the flange surrounding the central opening of the flange.

A preferred material for making the tube is a thermoplastic material, which becomes pliably plastic at about 500° F. Hence, the tube is heated to that temperature level and formed using an appropriate tool (not shown) so that flared end 24 of tube 22 lies flat along the surface of raised portion 26.

In similar fashion, the lower end of tube 22 is flared at end 28 along raised portion 30 of flange 16. Although flanges 14 and 16 do show raised portions 26 and 30, it is not necessary to have such a raised portion on a flange, if desired.

Although the translucent material provides means by which a liquid is visible internally thereof, it may be desired to also include a float 32. A convenient shape of float 32 is an an inverted cup that rides within the tube and having a shape that can be easily seen.

The inverted cup configuration will trap some air within the cup and will permit the float to rise to the surface of the fluid within the tube. Fluoroplastics density is 2.1 to 2.2 g/cc; however, with the entraped air even though the float is made of the same material as the tube it rises. Also, being of similar material to that of the tube, it is therefore equally resistant from attack as the tube by whatever the fluid is.

Further, if desired, a flow-through restrictor 34 in the form of a disk may be snapped into appropriate internal groove in the lower end of tube 22. The openings in restrictor 24 may be of any convenient configuration to permit fluid to readily flow therethrough while preventing float 32 from dropping out of the tube in the absence of fluid.

Now referring to FIG. 2, a similar liquid site monitor 22 is shown attached to an upper flange 40 and a lower flange 42. The flanges are not connected to a shield such as with FIG. 1. Otherwise, the construction of the liquid site monitor is the same as previously described. Although not shown in FIG. 2, the viewing tube may also include a float and a disk shaped flow-through restrictor, if desired.

A fluoroplastic material is a suitable material for use with hydrofluoric acid, which is well known to etch through glass. Such fluoroplastic material also has the further advantage, besides being corrosive resistant, of being very slick and therefore substances such as chocolate, for instance, which are notorious for sticking to a glass surface, will not adhere thereto. Thus, when the fluid rises and falls within the tube the surface of the fluid is readily visible through the tube.

It has previously been mentioned that such a tube as the viewing tube described above is pliable at 500° F. It is quite hard however to temperatures up to 400° F. and, therefore, is suitable as a monitor for any such fluids.

A preferred thickness of a fluoroplastic tube is 1/16-inch. However, tubes up to ⅛-inch still are sufficiently translucent to provide ready viewing of most fluids.

A preferred fluoroplastic material is FEP Teflon, which is a fluorocarbon copolymer made by polymerizing a mixture of tetrafluoroethylene and hexafluoropropylene. Teflon is a registered trademark of E.I. duPont de Nemours, Inc.

It should be noted further that the flared ends 24 and 28 form a raised face gasket so that when the liquid site monitor is bolted in place, the flared end operates as a gasket and no auxiliary gasket is needed.

Although it is assumed that the thermoplastic material is a neutral color, such materials do come in various shades, which mean that a different shade may be selected other than basically clear for use with different liquids, as desired.

While particular embodiments of the invention have been shown and described, it will be understood that the invention is not limited thereto as many modifications may be made and will become apparent to those skilled in the art.

What is claimed is:

1. A sight monitor for visually monitoring a liquid of an accompanying liquid system, the liquid system connectible to the sight monitor with connection means, the sight monitor comprising
    a thermoplastic tube having a longitudinal channel throughout its length for receiving liquid from the accompanying liquid system, the tube sufficiently translucent to permit the liquid to be seen in the tube,
    a hollow annular flange connected to the thermoplastic tube, the flange having a top, a bottom, a central opening in the top, an interior channel therethrough in communication with the central opening, and the top of the flange having a central section adjacent and about the central opening, the thermoplastic tube receivable in and received in the interior channel of the flange and its central opening,
    the flange having mating means for coaction with the connection means for connecting the sight monitor to the liquid system, and
    the themoplastic tube having at least one end with an outwardly flaring portion lying along the top of the flange to hold the tube in location at the flange, and the tube having a lower end through which the longitudinal channel extends.

2. A sight monitor in accordance with claim 1, and including a protecting shield attached to the bottom of said flange and aligned substantially parallel with said tube, said shield at least partially surrounding said tube.

3. A sight monitor in accordance with claim 1, wherein said thermoplastic tube is extrudable fluoroplastic.

4. A sight monitor in accordance with claim 1, wherein the central section of the top of said flange around its central opening includes a slightly annularly raised portion and wherein said outwardly flaring portion of said tube matches the annular raised portion of said flange and thereby operates as a raised-face gasket therefor.

5. A sight monitor in accordance with claim 1, wherein the thickness of said tube is in the range of approximately 1/16 to ⅛-inch.

6. A sight monitor in accordance with claim 1, and including a float within said tube.

7. A sight monitor in accordance with claim 6, and including a restrictor for preventing said float from falling out of the lower end of said tube while allowing liquid to pass therethrough.

8. A sight monitor in accordance with claim 7 wherein the float is a cup-shaped piece of fluoroplastic having a top and an open bottom, the cup disposed in the longitudinal channel of the tube so that the open bottom of the cup-shaped piece is beneath the top of the cup-shaped piece permitting liquid to enter the cup-shaped piece.

* * * * *